(12) United States Patent
Haarburger

(10) Patent No.: US 9,182,069 B2
(45) Date of Patent: Nov. 10, 2015

(54) SYSTEMS AND METHODS FOR ADAPTABLE MOUNTS FOR ATTACHMENT TO CYLINDRICAL SURFACES

(71) Applicant: Nite Ize, Inc., Boulder, CO (US)

(72) Inventor: Daniel J. Haarburger, Boulder, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 14/304,793

(22) Filed: Jun. 13, 2014

(65) Prior Publication Data

US 2014/0366357 A1 Dec. 18, 2014

Related U.S. Application Data

(60) Provisional application No. 61/834,502, filed on Jun. 13, 2013.

(51) Int. Cl.
*F16M 11/00* (2006.01)
*F16M 11/04* (2006.01)
*F16M 13/00* (2006.01)
*F16M 13/02* (2006.01)

(52) U.S. Cl.
CPC ............. *F16M 11/041* (2013.01); *F16M 13/00* (2013.01); *F16M 13/022* (2013.01); *Y10T 29/49826* (2015.01)

(58) Field of Classification Search
CPC combination set(s) only.
See application file for complete search history.

(56) References Cited

U.S. PATENT DOCUMENTS

| | | | | |
|---|---|---|---|---|
| 3,193,232 A * | 7/1965 | Hatcher | .................... | 248/231.81 |
| 4,541,555 A * | 9/1985 | Miree | .......................... | 224/420 |
| 4,618,081 A * | 10/1986 | Miree | .......................... | 224/420 |
| 4,754,901 A * | 7/1988 | Villanueva et al. | ............ | 224/418 |
| 5,450,993 A * | 9/1995 | Guerrero et al. | ............... | 224/246 |
| 5,522,122 A * | 6/1996 | Turchick et al. | ................ | 24/335 |
| 5,651,485 A * | 7/1997 | Impastato, II | ................ | 224/460 |
| 5,692,268 A * | 12/1997 | Case | .......................... | 24/16 PB |
| 5,941,434 A * | 8/1999 | Green | ......................... | 224/250 |
| 6,637,707 B1 * | 10/2003 | Gates et al. | ................. | 248/224.7 |
| 6,929,223 B2 * | 8/2005 | Hancock et al. | ............. | 248/74.2 |
| 6,932,309 B1 * | 8/2005 | Corey et al. | ................ | 248/231.9 |
| 7,594,631 B1 * | 9/2009 | Carnevali | .................... | 248/219.4 |
| 7,810,683 B2 * | 10/2010 | Chan | .......................... | 224/222 |
| D657,564 S * | 4/2012 | Baker | ........................... | D3/328 |
| 8,161,674 B2 * | 4/2012 | Holmberg | ......................... | 42/90 |
| 8,545,069 B2 * | 10/2013 | McCaslin et al. | ............. | 362/474 |
| 8,827,234 B2 * | 9/2014 | Baker | ........................... | 248/682 |
| 8,834,455 B2 * | 9/2014 | Kleven | .............................. | 606/1 |
| 2002/0113185 A1 * | 8/2002 | Ziegler | ....................... | 248/309.1 |

(Continued)

OTHER PUBLICATIONS

Ethicmade; "Handleband Frequently Asked Questions," (video clip), Jun. 11, 2013 (online), [retrieved on Sep. 7, 2014]; retrieved from the Internet: <URL:http://vimeo.com/68115038>; 0:37-0:45.

(Continued)

*Primary Examiner* — Monica Millner
(74) *Attorney, Agent, or Firm* — Haynes and Boone, LLP

(57) ABSTRACT

An adaptable mount that enables two devices, or one device, such as handheld electronics, tools, and other physical objects, and one surface to be securely connected. One embodiment enables this connection by use of a flexible appendage that wraps around either or both the surface and the device to secure them. One embodiment enables a secure connection through the use of additional hardware so to complement the functionality of the device.

17 Claims, 8 Drawing Sheets

(56) References Cited

U.S. PATENT DOCUMENTS

| | | | | |
|---|---|---|---|---|
| 2003/0106919 | A1* | 6/2003 | Chuang | 224/420 |
| 2003/0213822 | A1* | 11/2003 | Lautner | 224/221 |
| 2004/0020954 | A1* | 2/2004 | Gates et al. | 224/442 |
| 2005/0045681 | A1* | 3/2005 | Hancock et al. | 224/401 |
| 2007/0247858 | A1* | 10/2007 | Ford | 362/382 |
| 2008/0104803 | A1* | 5/2008 | Tsay et al. | 24/306 |
| 2010/0170926 | A1 | 7/2010 | Richter | |
| 2010/0264182 | A1* | 10/2010 | Perlman et al. | 224/409 |
| 2011/0303709 | A1* | 12/2011 | Wizikowski | 224/218 |
| 2012/0080465 | A1* | 4/2012 | Son | 224/276 |
| 2013/0299652 | A1* | 11/2013 | Graham | 248/205.1 |
| 2014/0191095 | A1* | 7/2014 | Le Gette et al. | 248/176.3 |

OTHER PUBLICATIONS

Ethicmade; "The Handleband," (video clip), May 28, 2013 (online), [retrieved on Sep. 25, 2014]; retrieved from the Internet: <URL:http://vimeo.com/67153890>; 0:49-0:54; 0:57-0:59; 1:01-1:12; 1:15-1:20; 1:49-1:52; 2:06-2:09.

Haarburger, Daniel; "The Handleband—phones, bikes, and open bottles," Kickstarter, Jul. 12, 2013 (online), [retrieved on Sep. 7, 2014]; retrieved from the Internet: <URL:https://www.kickstarter.com/projects/445602678/the-handleband>; first video clip, 0:48-0:54; What Is the Handleband, figures 1-4; The Design, video clip, paragraphs 1-3, figure 1.

International Search Report in co-pending PCT Application No. PCT/US14/42416 dated Oct. 22, 2014, 3 pages.

* cited by examiner

SYSTEMS AND METHODS FOR ADAPTABLE MOUNTS FOR ATTACHMENT TO CYLINDRICAL SURFACES

CROSS-REFERENCE TO RELATED APPLICATIONS

This application claims the benefit of U.S. Provisional Application No. 61/834,502 filed Jun. 13, 2013, which is hereby incorporated by reference to the same extent as though fully contained herein.

BACKGROUND

The advent of mobile computing devices, such as tablets, smartphones, and handheld computers, has shown the need for portable, adaptable accessories to extend the inherent capabilities of those devices. Especially considering the versatility of such products from a software perspective, enabled in part by the massive growth of independently developed applications, physical hardware is often the limiting factor hampering the usefulness of such technology.

One particular challenge that mobile device users face is using their technology "hands-free." As in the case of viewing media, hands-free use is often an ideal experience. However, the need for a robust solution is only accentuated when the "hands-free" use case is much more dynamic as opposed to a stationary mobile device propped up on a surface. In sports, for instance, hands-free device use is often the only way to use such technology. Still, few solutions exist that offer a secure, adaptable, robust and aesthetically pleasing answer to such needs.

Going further still, there are many instances where a product that securely holds a mobile computing device may solve the needs of a different, though similarly hand-free consumer need. As one example, a product that allows a consumer to attach their smartphone to the handlebars of their bicycle might be adapted to hold a flashlight, or other necessary piece of equipment. As such, it becomes clear that there is a significant need for multi-purpose mounting solutions that allow two devices to be united safely and securely.

SUMMARY

Embodiments of systems and methods for adaptable mounts for attachment to cylindrical surfaces include an adaptable mount that enables two devices, or one device and one surface to be securely connected. In one such use case, a device such as a mobile phone or portable computing device might be mounted to a cylindrical surface such as a bicycle handlebar or otherwise round object. In alternate embodiments, such surfaces may be planar or the object being mounted may be much larger or more complex. The elastic wrap-around functionality of the device is what best enables this versatility and this adaptability is unique. In addition, the small size of the adaptable mount, its simplicity from both a manufacturing and use perspective, and the mechanism by which it securely connects the two devices are other key differentiators.

Though embodiments of the adaptable mount can be scaled for use with different products of different sizes (herein referred to as devices or in singular as the device), for the sake of clarity, the attached embodiments and descriptions will focus on the adaptable mount's ability to mount small-scale devices including but not limited to mobile computers, smartphones, flashlights, and the like. Furthermore, embodiments of the adaptable mount is designed to connect to variety of surface options (herein referred to as the surface) including planar surfaces, large objects, or cylindrical components. However, this disclosure will assume the surface to be a small cylindrical surface in order to better convey the functionality of embodiments of the adaptable mount.

Embodiments of an adaptable mount are comprised of two parts combined via molding, mechanical connections, or similar manufacturing processes to produce a single, cohesive unit. As such, embodiments of the adaptable mount are singular and cannot be broken down into its component pieces without ruining its overall functionality. This simplicity may be desirable for a number of reasons. It enhances the user's experience with the product given that there are fewer components to configure. It involves fewer manufacturing processes and fewer components, thus both simplifying and reducing the overall cost of production. There are fewer components to break, thus the overall durability of the device is increased. Plus, this design allows for a much smaller form factor, which is both aesthetically pleasing and more affordable from a manufacturing perspective.

Two parts that comprise embodiments of the adaptable mount are a rigid insert and a solid main body which may be made from a flexible material such as silicone, rubber, a flexible thermoplastic or the like. Like so, the rigid insert may be made from any variety of materials including but not limited to plastic, metal, or organic materials, and may be produced from any number of manufacturing processes such as extrusion, molding, machining, or others not here listed. Alternate embodiments may not include the rigid insert, but instead rely on some mechanical aspect of the part body to serve the role of said insert. For instance, there are cases where the insert serves as a hook to which the part body attaches. In alternate versions, this same functionality may be achieved solely within the part body in absence of the insert. A slot and belt, tongue and groove, or any variety of other mechanical connection points might be utilized to achieve this "hook" functionality.

Though embodiments of the adaptable mount are a single unit, it may be useful to identify the different aspects of embodiments of the adaptable mount separately. The body of the part refers to the section of the unit where the part is placed upon the surface, and where the insert is optionally inset. The tail of embodiments of the adaptable mount refers to a slender appendage connected to the body the purpose of which is to wrap around the device being held. The rigid insert will be identified as the insert, but may also be referenced as the front or rear hook since one of its primary roles is to hold the tail in place. The part refers to the tail, body, and insert combined into a single unit.

Useful features of embodiments of the adaptable mount include: the ability of the embodiments of the adaptable mount to securely connect to a surface and the ability for it to safely hold a third party device. As mentioned above, a core aspect of this design is its adaptability to a wide range of use cases. As such, several design features exist to better enable the part to interface with a wide range of surfaces and devices.

When connecting to a surface, there are a number of different options by which that attachment may occur. In one embodiment, the tail wraps around the Surface to connect both the part and the surface. In some instances, this connection will be ideal because it is impermanent and makes both the device and the part easily removable. In another embodiment, this connection may be made using separate hardware—including but not limited to Zip-Ties, straps, screws, bolts, or the like—and may be threaded or slid through the body of the part. For instance, if connecting the part to a planar surface, a user might find it easiest to use screws to fasten the part to the surface. Slots on the part body accommodate this hardware versatility. Alternatively, if a user is worried about theft, they might prefer a more permanent solution, such as the use of straps or zip-ties. Embodiments of the adaptable mount are designed specifically to accommodate this wide range of use cases.

The enclosed figures identify two different embodiments of the adaptable mount that illustrate different techniques for mounting to a cylindrical surface. One (FIG. 1-FIG. 5) includes a tail that wraps around the surface to connect the part and surface together. It hooks first to the front of the insert, then continues to wrap around the Device and hooks again to the back hook of the insert. Herein it serves to unite the part, the device, and the surface into a single functional unit. The other drawings (FIG. 6-FIG. 10) identify an embodiment for which the tail also connects the device to the part. However, in this manifestation the part includes four slots for mounting to an external surface. These slots are optimized for use with a strap or zip-tie and are inset into the surface of the part as a result. In alternate designs, these slots might manifest themselves as countersunk holes for the use of screws or bolts. In others still, the connection between the adaptable mount and the surface might be a snap fit, or a different mechanical connection designed either for adaptability or compliance with complimentary components.

To hold the device in place, embodiments of adaptable mounts wrap around and connects to itself to sandwich the device in place. This single-piece strap creates an incredibly secure connection. It also creates a connection that is incredibly adaptable, since the wraparound tail can easily stretch and bend to accommodate different geometries. As mentioned above, single piece construction of the product is beneficial for several reasons. However, there are circumstances where separate, removable straps may be advantageous. For instance, a modularized strap system could be convenient for use with particular or specialized hardware. In alternate embodiments, the tail might be removable or adjustable such that it could be swapped with others or adapted to meet the needs of the situation.

Furthermore, the means by which the above mentioned wrapping system occurs may also take on different forms. In one embodiment (illustrated in the attached drawings) there is a single tail connected to the body which either wraps around either or both the surface and the device. However, in alternate embodiments this wrapping mechanism may be separated into two tails, appendages, or similar securement mechanisms. Furthermore, while this disclosure centers primarily on the use of an elastic tail, in alternate embodiments this means of attachment may be rigid, flexible, custom fit to the device in use, or utilize any number of mechanisms to secure either the device to the part or the part to the surface.

Likewise, the body of the part and the part as a whole may take on a number of different functions beyond securing a device in place. For instance, the body may be designed such that it contains internal electronics to serve a variety of functions including but not limited to ride-tracking (as would be the case if attached to a bicycle or similarly mobile vehicle), luminescence, GEP (Geo-Event Processor) tracking, GPS Tracking, device monitoring, mobile power supply and storage, or the like. Utilizing a variety of different materials is another means by which the Part may take on additional functionality. In another embodiment, the adaptable mount may be painted or produced from a luminescent or "glow-in-the-dark" material thereby enabling better use at night.

There are also a number of means by which the part could interface with existing surfaces and devices. For instance, the part may be specially molded to attach mechanically to a particular surface (like a particular model of Handlebar) or a particular device (like a particular model of iPhone® produced by Apple Inc). In one embodiment, the body might involve a circular cutout which allows the Part to slide onto, and fully encircle a cylindrical surface. Alternately, the adaptable mount or part may contain one or more means positions for attachment to a cylindrical. This might take the form of self-intersecting slots that enable angular adjustment or varied slot diameters in order to accommodate a wider range of surfaces.

In another form, the body might include a divot, depression, or similar feature to contact the device on one or more surfaces. In a different version, the adaptable mount may attach to a third party part which in turn is responsible for holding the device. With mobile computing devices, the desire to for protection from the elements is often desirable. For this reason, the use of cases, sleeves, and waterproof or impact resistant accessories are often useful complements to the initial computing device. The disclosed adaptable mount may or may not include specifically designed features to accommodate or support this peripheral hardware.

Useful features of embodiments of the adaptable mount are derived from the versatility of its design, and its adaptability from both an implementation and use case perspective. The part or adaptable mount offers a myriad of connection mechanisms by which either or both a surface and device can be united with the adaptable mount. This secure connection enables and enhances a wide range of uses that would otherwise be challenging or impossible without embodiments of the adaptable mount.

In one embodiment, an adaptable mount includes a body, the body having a first and second hook. The adaptable mount further includes a tail, attached to the body, the tail adapted to attach to the first and second hook, the first hook having a protrusion in a first direction, the first direction towards a first side of the body, the second hook having a second protrusion in a second direction, the second direction in the direction of a second side of the body, the first side of the body opposite the second side of the body. Optionally, the tail includes a first, a second, and a third cutout, the first, a second, and a third cutout providing for an area for the first and second hook to hook the tail. Alternatively, the second cutout is positioned to not interfere with the operation of a device that the adaptable mount holds when the tail is engaged with the hooks. Optionally, the second cutout is positioned to coincide with the touch menu interface of an electronic device when that the adaptable mount holds when the tail is engaged with the hooks. In one configuration, the first side of the body has a semi-circular relief. In another configuration, the semi-circular relief is adapted to interface with handlebars of a bicycle. Optionally, the adaptable mount is adapted to have a first configuration and a second configuration, the first configuration characterized by the first side engaging a first object, the tail wrapped around the first object and engaging the first hook and the second side engaging a second object, the tail wrapped around the second object and engaging the second hook, the first and second object held together by the adaptable mount, the second configuration characterized by the tail not engaging the first and second hook and the first and second object not held together. Alternatively, an end of the tail includes a protrusion adapted for gripping. In another configuration, the second side of the body includes treads for gripping. In one alternative, the body includes a slot for mechanically attaching the adaptable mount to a surface with a fastener. In another alternative, the tail is adapted to stretch when in the first configuration, applying tensional force to the first and second object. Optionally, the body includes a third and fourth side, the first hook projecting from the third side and the second hook projecting from the fourth side. Alternatively, the first and second side of the body are approximately perpendicular to the third and fourth side of the body. In another configuration, the tail projects from fourth side of the body. In another alternative, the third and fourth side are opposite each other on the body. Optionally, the tail has a length, and the length is less than a length needed to wrap around the body two times.

In one embodiment a method of attaching two objects includes providing an adaptable mount and placing a first object on a first side of the adaptable mount. The method further includes wrapping a tail of the adaptable mount around the first object to a first hook and engaging the first hook with the tail. The method further includes placing a second object on a second side of the adaptable mount, wrapping the tail of the adaptable mount around the second object to a second hook, and engaging the second hook with the tail. Optionally, the method includes stretching the tail as part of the wrapping and engaging around the first and second object. Alternatively, the method includes positioning a cutout area of the tail on the second object, such that the cutout area is position to provide access to a touch interface menu of the second object, the second object being an electronic device. Optionally, the first side has a cylindrical recess and is adapted for receiving a cylindrical shape.

BRIEF DESCRIPTION OF THE DRAWINGS

The accompanying drawings, which are incorporated herein and constitute part of this specification, illustrate exemplary embodiments of the adaptable mount, and, together with the general description given above and the detailed description given below, serve to explain the features, principles, and methods of the adaptable mount.

In the figures, the thickness and configuration of components may be exaggerated for clarity. The same reference numerals in different figures represent the same component. The broken lines in the figures are for illustrative purposes only and form no part of the claimed device.

DETAILED DESCRIPTION

Figure 1:
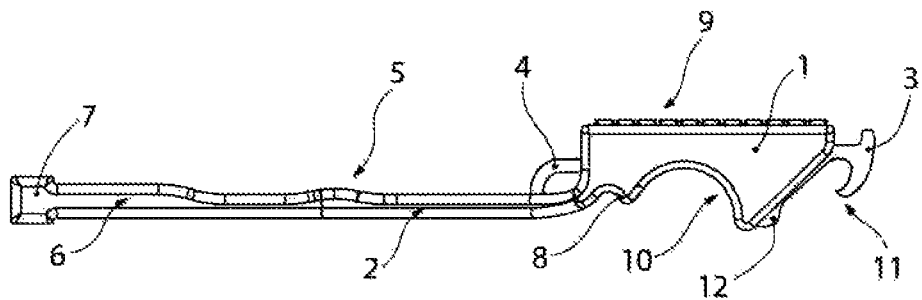
FIG. 1 is a left-side view illustrating an embodiment of an adaptable mount for attachment to cylindrical surfaces.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure.

The disclosed technology relates to a universal mounting system that connects, combines, or otherwise unites one device with a separate surface. Specifically, the technology relates to mounting portable technology to a substrate such that it can be used hands-free. A primary use case, though not one to be interpreted as limiting, involves the connection of a handheld device such as a mobile phone to a cylindrical surface like a bicycle handlebar. A more detailed description of this mechanism and the enabling aspects are described below.

FIG. 1 illustrates a left side view of one embodiment of an adaptable mount. It consists of a primary body 1 with an extruded tail 2. In use, the body 1 of the part is placed upon a cylindrical surface such that the surface nests into a circular cutout 10 in the part. The tail 2 then wraps first around the surface until it reaches the front hook 3 of the device. It continues to wrap over the treaded top-face 9 of the body 1 and connects to the rear hook 4 of the metal insert. This tail 2 is reinforced at the points 5 & 6 where it contacts the insert. The lateral reinforcements at points 5, 6 are where the tail is adapted to interface with the hooks to attach the adaptable mount. In order to facilitate manipulation of the tail, it contains a widened thumb grip 7 for easier use. Similarly, this embodiment contains a semi-circular relief channel 8 to ensure a more consistent wrap around the surface. Additional utility is derived from the underside of the front hook 11, which is hooked to enable more effective gripping and leverage against small objects. For instance, the underhook 11 and insert nub 12 together function to enable easy opening of bottled goods such as beer bottles, soft drinks, etc.

Figure 2A:
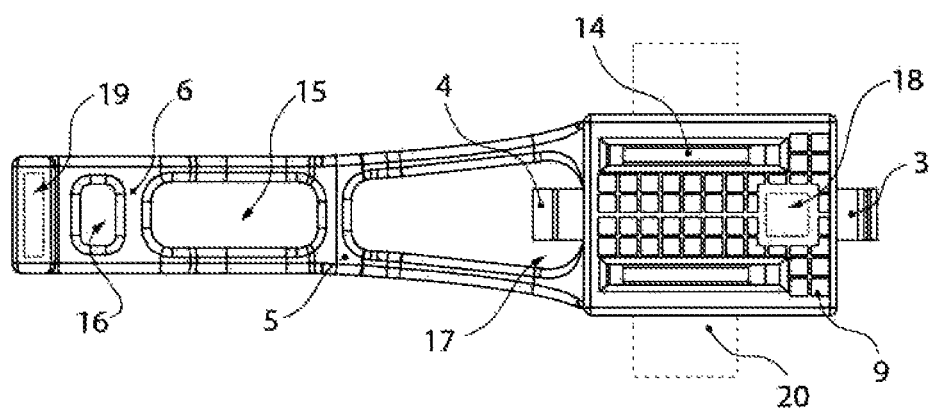
FIG. 2A is a top view illustrating an embodiment of an adaptable mount shown in FIG. 1.

FIG. 2A offers a top view of the same embodiment and provides for a more detailed view of this wraparound hook system. The part's tail appendage involves three cutouts 14, 15, 16 to enable more effective manufacturability as well as connection to the front and rear hooks (4 & 3) of the hooked insert. The tail's first connection point 5 connects to the front hook of the part 3 by wrapping around the cylindrical surface 20 to which the part is attached. The position and number of connection points may vary and should not be limited by the descriptions or illustrations existent in this disclosure. In alternate embodiments, numerous connection points may exist to enable adjustment or more effective connection to varied surfaces. Like so, multiple hooks may exist to unite multiple devices, surfaces or other objects.

Figure 15:
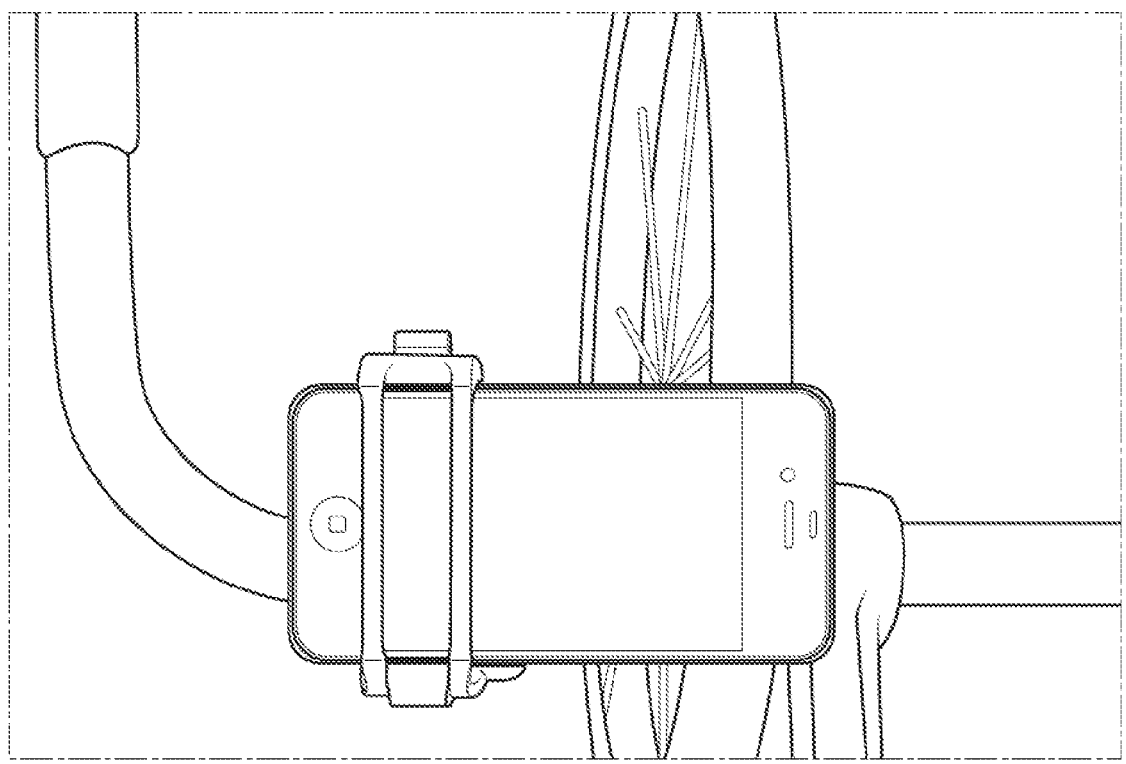
FIG. 15 shows a perspective view of an embodiment of an adaptable holder engaged on a device where a cut out in the tail portion corresponds with an active area of the device display.

The second cutout 15 ends with the second connection point 6 of the tail. This cutout is optimally positioned so as not to cover or obstruct viewing of the device which it secures. In alternate embodiments the dimensions, shape, and configuration of said cutout may be adjusted to accommodate devices both more specifically and more broadly. Further, the thickness, dimensions, and geometry of the tail 2 may be adjusted so as to enhance a variety of traits including but not limited to strength, elasticity, resistance, weight, portability and others. The second cutout 15 is specially sized, in the embodiment shown, to provide a window for menu controls on devices such as the Apple iPhone. As shown in FIG. 15, the second cutout 15 may be oriented where the menu will appear on the phone, minimizing the interference of the adaptable mount with the operation of the device. The second connection point 6 attaches directly to the rear hook 4 by looping over and pulling against its underside. However, the means by which this connection occurs may also be different in alternate embodiments. A tighter fit, snap-together components, or alternate connection mechanism may be employed to secure the tail and hook together.

In some instances, adjustability may be needed to accommodate devices of different sizes. Here the third cutout 16 provides an additional connection point which may be used to provide increased length to the point between the first connection point 5 and where the tail 2 meets the rear hook 4. In other versions, many additional connection points may exist to enhance adaptability. Similarly, the size of the cutout and amount of support material may be adjusted. At the far end of the tail is a protrusion 7 designed to enable better gripping and manipulation of the tail. Here, there may be a flat or otherwise clear surface 19 wherein writing, branding, or other markings such as a serial number, logo, or the like may be placed. Alternately, additional grip could be placed on said surface to further enhance manipulation of the device. A similar surface 18 exists on the part's body.

FIG. 2A also shows the position of two slots 14 whereby additional hardware may be placed in order to secure the device in place. In the provided figures, said slots are positioned side-by-side and parallel to one another. In alternate versions, however, such attachment features may be of any number, size and orientation to better accommodate the surface they intend to secure. They may also manifest as holes, cutouts, or other elements beyond slots.

Figure 2B:
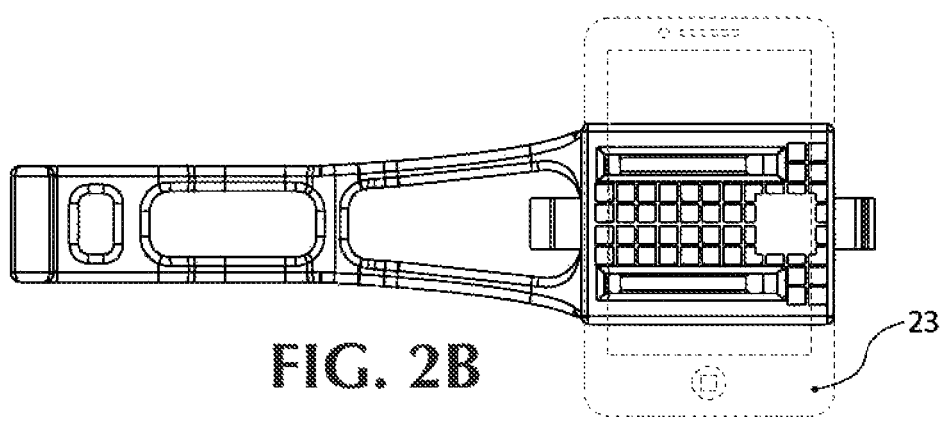
FIG. 2B is a top view of the mount shown in FIG. 2 that identifies the placement of a device such as a smartphone or portable computing device.

FIG. 2B extends the top view of the device provided in FIG. 2A by identifying the placement of a portable device, such as a mobile computing device. In the depicted embodiment, the device is placed flat upon the body 1 such that the tail 2 may wrap around and secure it. Treads 9 provide grip to better secure said device, and may consist of squares, circles, lines, cutouts, or any geometry intended to better facilitate the connection to a device. Similarly, though the attached drawings show the position of the treads 9 to be at the top of the body 1, said treads may exist at any position including but not limited to the body 1, the tail 2, the circular undercut 10 where the body meets the surface, or other locations. Additionally, these grips and treads may consist of more involved geometric elements such as suction cups to hold the device more securely. There may be many or few treads and they may be removable in alternate versions.

Figure 3A:
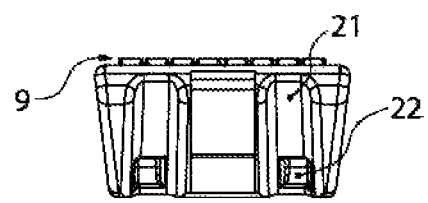
FIG. 3A is a front view of the adaptable mount shown in FIG. 1.

FIG. 3A is a front view of the embodiment depicted in FIGS. 1 and 2A. As illustrated, the adaptable holder includes slotted cutouts—22—that extend the opportunity to secure external hardware to both the body of the mount 1 and the surface 20. In the disclosed embodiment, the slots 14 are accessible from the top of the unit and exit the base through four cutouts 22. However, in different versions, these attachment points may be accessible only from the top or bottom (not necessarily both). Similarly, they may involve the use of custom mechanical connections including but not limited to snap fits, connection joints, hooks, locking mechanisms, hardened components, and the like.

Figure 3B:
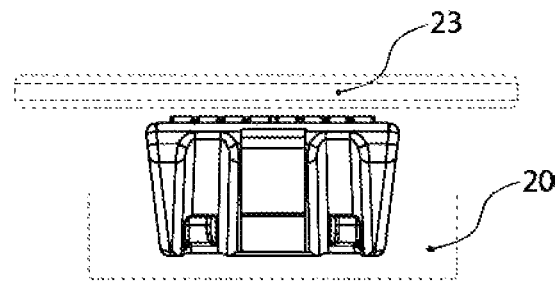
FIG. 3B is a front view of the adaptable mount and device shown in FIG. 3.
Figure 4:
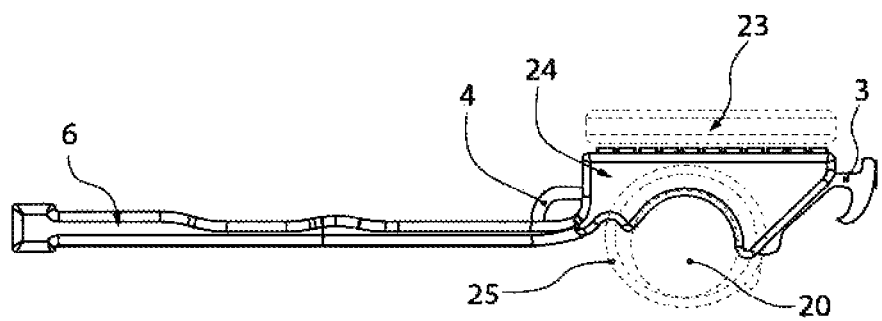
FIG. 4 is a left-side view according to the disclosure of the stand in FIG. 1 identifying the position of a device attached to the body and separate hardware connecting the body to the surface.

Also shown in FIG. 3A are two frontal grooves 21 intended to nest and/or contain the tail 2 of the mount. When wrapped, the tail rests in these grooves and becomes flush with the surface of the body 1, therein creating a more streamlined, elegant, and aesthetically pleasing configuration. In different versions, the depth, geometric configuration, means of connection with the tail, and number of these nesting/connection features 21 may differ but should be included in analysis of this disclosure. FIG. 3B extends the depiction in FIG. 3A to identify one possible placement of a handheld device 23 and a surface 20. FIG. 4 further identifies the usefulness of the adaptable mount in combination with external hardware. Here, a strap or securement mechanism 25 is inset in the slots on the body 1 of the mount, protrudes through the cutouts 22 at its base, and wraps around the cylindrical surface 20 to unite the mount and surface securely. In alternate embodiments, the means by which this connection occurs may vary and should accommodate, inclusively, flexible connection hardware, hard or rigid connection hardware, customized connection hardware, or other means of uniting either the mount and a surface, the mount and a device, or the mount the surface and a device. Herein the term device includes any part, component or piece intended to be connected to the aforementioned surface or mount.

Figure 5:
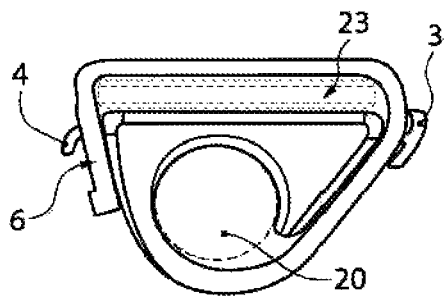
FIG. 5 is a left-side view illustrating an embodiment of the adaptable mount for use in securing a device to a cylindrical surface.

FIG. 4 shows a side view of an embodiment of the adaptable mount with the tail 2 wrapped around a surface and device in order to connect them. Here, the tail wraps and connects first to the front hook 3 of the mount. By this means it secures the mount to the surface 20, which may take any geometric or organic shape. It then wraps around the device 23 in order to secure said device to the mount. This connection is made possible when the tail 2 attaches to the rear hook 4 of the mount and a reinforced connection point 6. The wrapping connection mechanism identified in FIG. 5 may manifest itself in a variety of implementations. In one version, the tail may be flexible and rely on the natural elasticity of its material in order to ensure a secure connection. In another, a ratchet, clasp, or lever mechanism may facilitate and produce this connection. Custom fit components may be used to create a more robust attachment, and the connection point 6 where the tail meets the front and rear hooks (3 and 4 respectively) may be reinforced by any variety of means including but not limited to the addition of extra material, the inclusion of support features and separate hardware, the use of alternate hook mechanisms or the like.

Further still, this wrap-around system may secure any number of individual components and surfaces. For instance, the tail-wrap may connect only to the front hook 3 of the body. Therein, it may secure only the mount to the surface 20. Alternately, the tail may begin at the front of the body 1 and wrap only over a device and not a surface. Herein, the mount would hold a device in place but rely on external hardware or alternate methods of connecting the mount to the surface.

Figure 6:
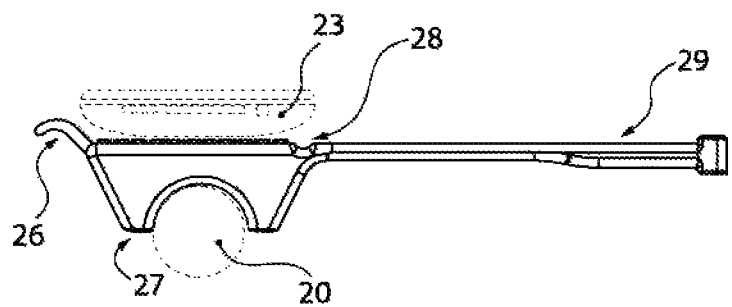
FIG. 6 is an alternate embodiment of the adaptable mount with self-intersecting slots for angular adjustment relative to the surface.

FIG. 6 illustrates a side view of one such embodiment, wherein the tail 29 extends from the front of the unit and wraps solely around the device 23. Here, slotted cutouts 27, 33 provide a means of inserting external hardware for connecting the body of the mount to the surface 20. Like the aforementioned embodiment where the tail contacts both the surface 20 and the device 23, a small channel 23 exists to better enable the bending, wrapping, and manipulation of the tail. This cutout may manifest itself in any variety of ways, including but not limited to slots, channels, depressions, alternate materials, or similar mechanical features, like hooks and pivots, hinges, etc. In the embodiment in FIG. 6 exists a front-hook 26 which is elevated above the surface of the mount. This illustrates an alternate embodiment of the hook to which the tail secures. In this depiction, the elevated hook provides a more effective means of accessing the tail when the connection is made. Especially in the situations where the surface may run parallel or collinearly with the mount, this ease of access is particularly desirable.

Figure 7A:
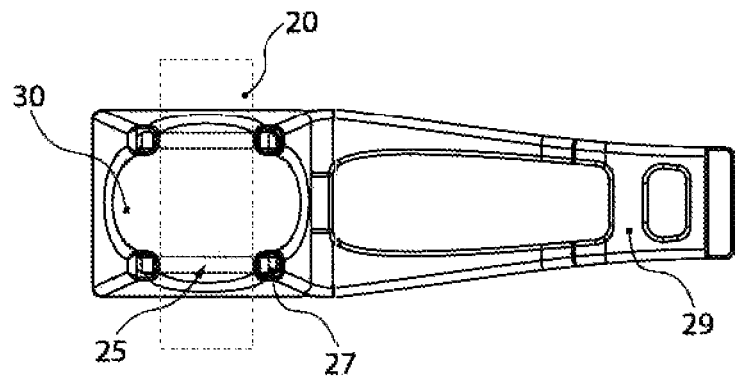
FIG. 7A is a bottom view of the embodiment in FIG. 6 wherein the adaptable mount mounts orthogonally to the cylindrical surface.
Figure 7B:
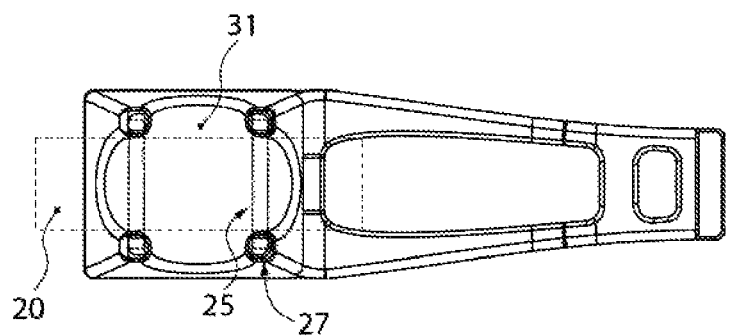
FIG. 7B is a bottom view therein with the cylindrical surface mounted parallel to the orientation of the adaptable mount.

FIGS. 7A and 7B both offer an underside view of the mount as it is positioned relative to the surface. In FIG. 7A the mount is attached orthogonal or perpendicular to the surface. The cylindrical surface 20 rests against a cylindrical cutout 31 and is surrounded by four corner slots 27 which provide for an attachment point where external hardware my be connected. FIG. 7B identifies a similar situation, except here the mount is aligned parallel to the surface 20. Like in its orthogonal configuration, the surface may rest in a recession 31 designed to accommodate said surface. However, the design, configuration, texture, and geometry of this recession my take shape in any number of ways. It may include treads, cutouts, slots, channels, grips, or any variety of elements for interfacing with a surface. Similarly, the recession may be of any depth, or may not even exist. It is also worth noting that while the attached figures illustrate two potential orientations of the mount relative to the surface, alternate embodiments may enable any relative orientation with regards to angle, pitch, depth and the like. Also, while the attachment hardware 25 is shown to run perpendicular to the surface in order to connect the surface and the mount, any orientation and configuration of features may exist to enable the use of additional hardware. This use includes but is not limited to the connection of the mount to the surface, the mount to the device, or the alteration of the mount itself for better usability.

Figure 8A:
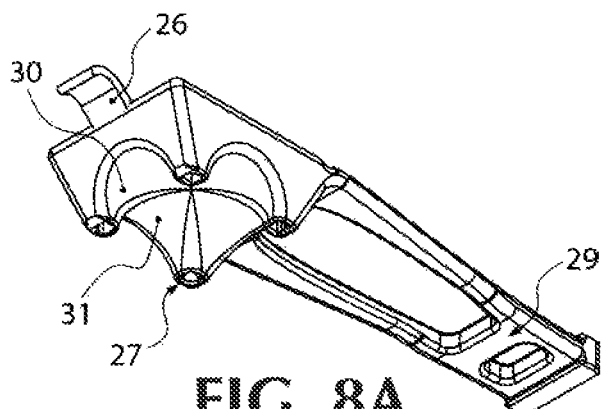
FIG. 8A is a front-right-bottom isometric view of an adaptable mount consistent with FIG. 6.
Figure 8B:
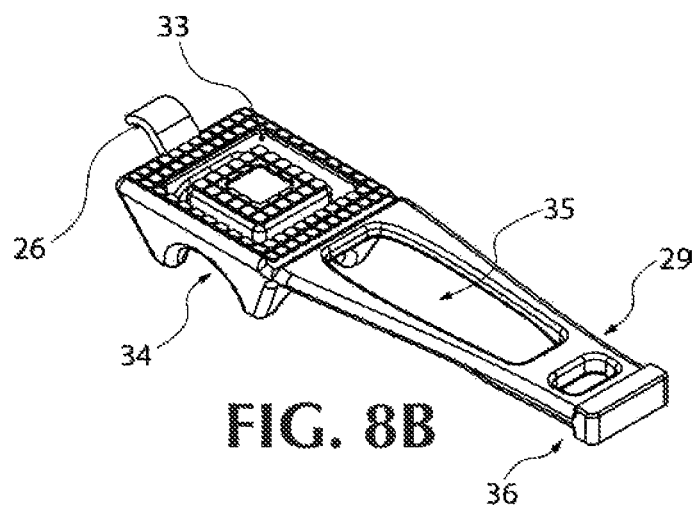
FIG. 8B is a rear-top-right isometric view consistent with the embodiment in FIG. 8A.

FIGS. 8A and 8B offer isometric views to further illustrate the features of the embodiment in FIGS. 6 and 7A. FIG. 8 is a front-right-bottom isometric view. Here, two intersecting channels 31 and 30 cross perpendicularly to enable either parallel or orthogonal positioning of the surface relative to the mount. Slot holes 27 are mounted at the vertexes created by the intersection of these slots. They are positioned to accommodate the use of external hardware, including but not limited to zip ties, straps, clamps, bolts, nuts, screws and the like. They may exist in greater or fewer numbers and may take different positions relative to the channels 30 & 31. FIG. 8A also identifies an adjustable connection mechanism 29 consistent with the adjustable connection point in the embodiment in FIG. 2A. Here, an additional cutout provides a means of hooking the tail to the hook in either of two positions, resting either against a cross slat 29 or rear connection point 36. Any number, size, geometry, and position may exist among these or additional connection points.

Figure 9:
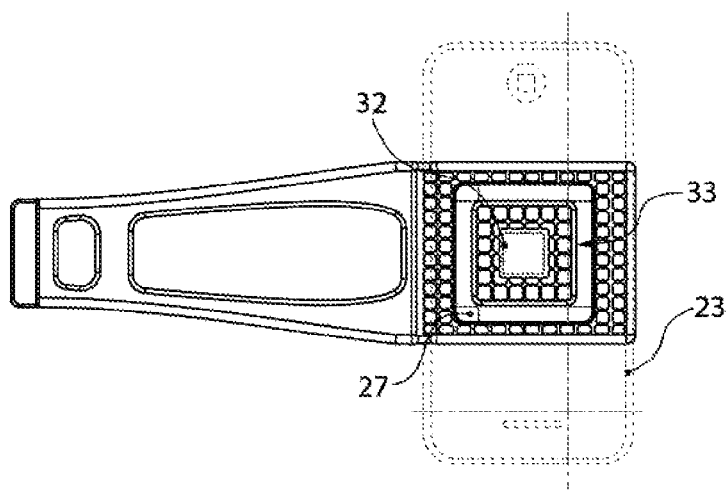
FIG. 9 is a top view of the embodiment identified in FIG. 8A that shows the mounting position of a separate device such as a hand held computing device.

FIG. 8B is a rear-top-right isometric view of the embodiment in FIG. 8A and offers a more detailed view into the hook 26 and hardware slots 33 of the part. Here the slots 33 produce a rectangular recession because they connect each of four through-holes 27. The configuration and layout of these recessions, however, need not be contingent upon the position of the through holes. Additionally, the may be parallel, crossed or otherwise configured to enhance the usability and aesthetics of the device. FIG. 8B also identifies a view-window 35 in the tail, intended to provide means of accessing and interacting with the device connected to the mount. FIG. 9 illustrates one potential position of such a device 23 relative to the body of the mount embodied in FIGS. 7 through 10. It also illustrates the position of a blank space which may be used for as a surface to include writing, branding material, design elements, electronic components, or any other feature that would gain benefit from an otherwise planar surface.

Figure 10:
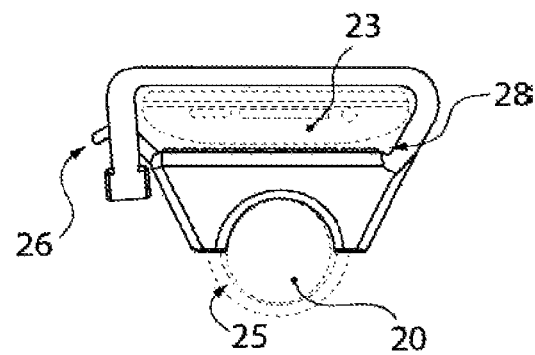
FIG. 10 is a right-side view of the embodiment in FIG. 9 in use with a handheld computing device and secured by means of external hardware.

FIG. 10 is a left-side view of the embodiment in FIGS. 7-9 in use with a handheld device 23 and piece of connecting hardware. Like in the embodiment in FIGS. 1-6, the device 23 is secured in place by means of a tail that wraps around and connects to a front hook 26. Unlike the alternate embodiment, however, this figure illustrates a means of connecting the mount to the surface exclusively with external hardware 25.

Here, the hardware is connected through the slots 33 on the surface of the mount, and wrap around the surface 20 to unite the two.

Figure 11A:
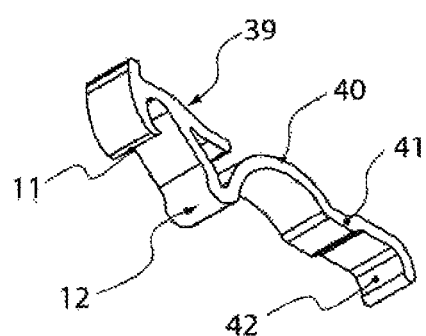
FIG. 11A is a front-right-bottom view of a reinforcing insert independent from the adaptable mount.

FIG. 11A is a detailed view of a component inset into the mount, which identifies one means by which the hooks might be built into the part. In this embodiment, the insert consists of a single unit curved to fit most effectively with the mount. An arching curve 40 accommodates the surface undercut 10 existent in the mount body. A non-linear contour enables the insert to better nest within the body of the mount by surrounding itself with material one or more sides. Additionally, several pivot points 12 & 41 cause the insert to pivot upon itself when force is applied to one end, as might be the case when a tail or similar feature is hooked or connected to it. For instance, if the tail of the mount identified in the above descriptions were connected to the rear hook 42, some of the force will be distributed into the rear pivot 41, thereby causing the rear hook to flex rather than dislodging the entire insert from the surrounding material. The same goes for pivot 39 when applied to the front hook.

Figure 11B:
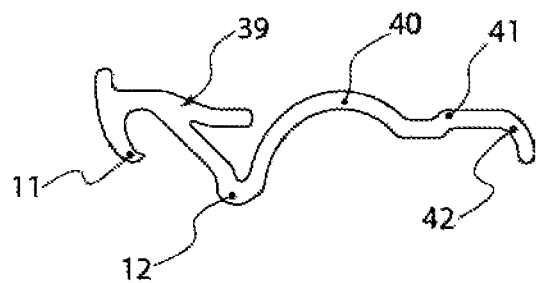
FIG. 11B is a right-view of the a reinforcing insert of FIG. 11A.

FIG. 11B offers a right side view of the insert in FIG. 11. Here the contours of the part are depicted most clearly, and illustrate how the profile of the insert may match the profile of the mold itself. This view also conveys the added versatility afforded by the use of a separate insert. For instance, the curved aspect 11 beneath the front hook creates a lever point again the base of the insert 12. This lever offers useful functionality, including but not limited to opening bottles, bike repair, and other situations where added leverage is needed.

Figure 13:
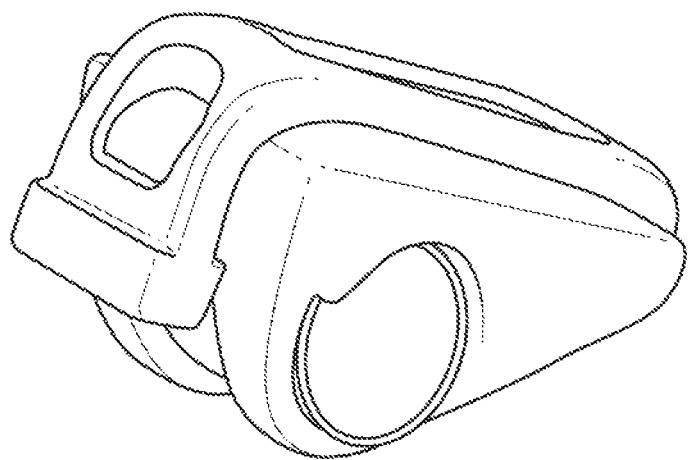
FIG. 13 shows a perspective view of an embodiment of an adaptable holder engaged on a cylindrical surface.
Figure 14:
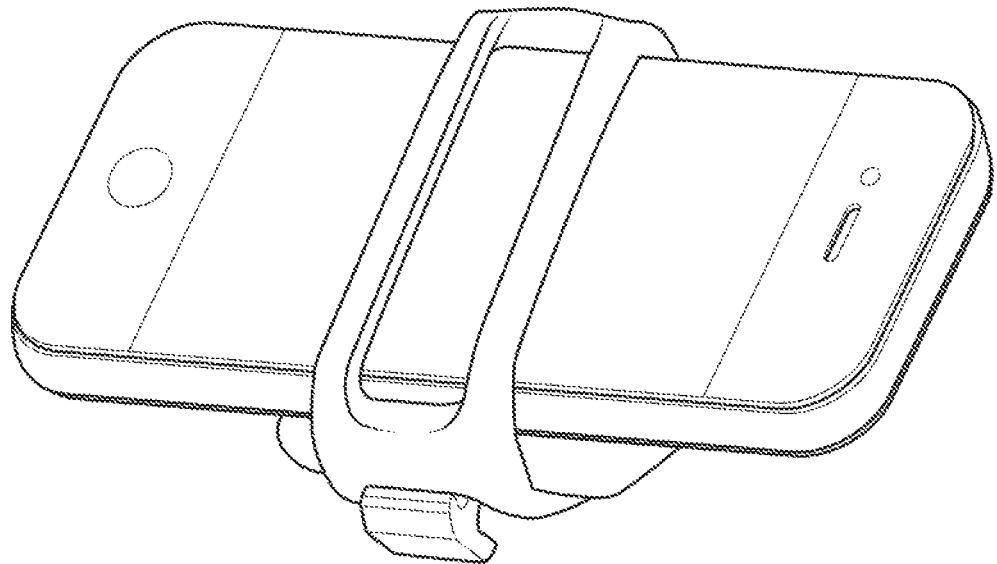
FIG. 14 shows a perspective view of an embodiment of an adaptable holder engaged on a device.

FIGS. 13-15 show the adaptable mount in use. In FIG. 13 the adaptable mount is shown wrapped around a cylindrical object with may be handle bars of a bike. In FIG. 14, the adaptable mount is shown holding a device. In FIG. 15, the adaptable mount is shown with the second cutout positioned concurrently with the menu function on a iphone.

Figure 12:
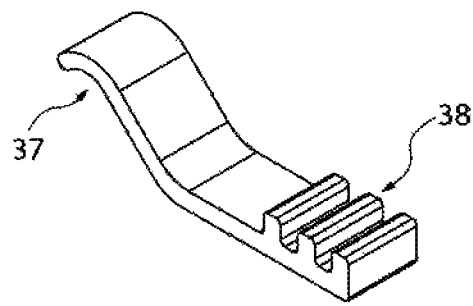
FIG. 12 is a top-right-rear isometric view of an alternate embodiment of a reinforcing insert independent from the mount herein disclosed.

However, in alternate embodiments, this same leverage may not be necessary. Additionally, in instances where only one hook rather than two is required different geometry may be optimal. FIG. 12 identifies one such embodiment with a single hook, consistent with an embodiment of the mount in FIGS. 7-10. Here, the hook curves upwards from the surface of the mount and the base of the insert to enable better access to the contents being hooked. Also, ribs are added to help the insert better connect to the material in which it is suspended. This connection may manifest in a variety of ways such as ribs, holes, particular geometry, or the use of external fasteners including but not limited to screws, bolts, thread, wire, and others. Lastly, the geometry of the listed inserts is largely two dimensional, but need not be in alternate embodiments. While largely two dimension geometry is optimized for some manufacturing processes, the production of said inserts may involve any number of processes including extrusion, machining, molding, stamping, additive production processes, subtractive production processes or the like. Further, alternate embodiments may include additional operations and dimensionality to enhance the user's experience. Locking hooks, snap hooks, rounded edges, inserts that involve electronic functionality, and removable or adjustable inserts are some of the potential manifestations said insert may take.

While embodiments of an adaptable mount has been disclosed with reference to certain embodiments, numerous modifications, alterations, and changes to the described embodiments are possible without departing from the sphere and scope of this disclosure, as defined in the appended claims. Accordingly, it is intended that embodiments of the adaptable mount not be limited to the described embodiments, but that it has the full scope defined by the language of the following claims, and equivalents thereof.

The invention claimed is:

1. An adaptable mount for securing a device to an object comprising:
   a body, the body having a first hook and a second hook and two frontal grooves;
   a tail, integral with the body, the tail adapted to attach to the first and second hooks and nest between the two frontal grooves, the first hook having a protrusion in a first direction, the first direction towards a first side of the body, the second hook having a second protrusion in a second direction, the second direction in the direction of a second side of the body, the first side of the body opposite the second side of the body, wherein the tail includes a first cutout, a second cutout, and a third cutout, the first, second, and third cutouts including lateral reinforcements therebetween providing for an area for the first and second hooks to hook the tail, wherein the adaptable mount is adapted to have a first configuration and a second configuration, the first configuration characterized by the first side engaging a first object, the tail wrapped around the first object and engaging the first hook and the second side engaging a second object, the tail wrapped around the second object and engaging the second hook, the first and second objects held together by the adaptable mount, the second configuration characterized by the tail not engaging the first and second hooks and the first and second objects not held together.

2. The adaptable mount of claim 1, wherein the second cutout is positioned to not interfere with the operation of the device that the adaptable mount holds when the tail is engaged with the hooks.

3. The adaptable mount of claim 1, wherein the second cutout is positioned to coincide with a touch menu interface of the device that the adaptable mount holds when the tail is engaged with the hooks.

4. The adaptable mount of claim 1, wherein the first side of the body has a semi-circular relief.

5. The adaptable mount of claim 4, wherein the semi-circular relief is adapted to interface with handlebars of a bicycle, the bicycle being the object.

6. The adaptable mount of claim 1, wherein an end of the tail includes a protrusion adapted for gripping.

7. The adaptable mount of claim 1, wherein the second side of the body includes treads for gripping.

8. The adaptable mount of claim 1, wherein the tail is adapted to stretch when in the first configuration, applying tensional force to the first and second objects.

9. The adaptable mount of claim 1, wherein the body includes a third side and fourth side, the first hook projecting from the third side and the second hook projecting from the fourth side.

10. The adaptable mount of claim 9, wherein the first and second sides of the body are approximately perpendicular to the third and fourth sides of the body.

11. The adaptable mount of claim 10, wherein the tail projects from the fourth side of the body.

12. The adaptable mount of claim 11, wherein the third and fourth sides are opposite each other on the body.

13. The adaptable mount of claim 12, wherein the tail has a length, and the length is less than a length needed to wrap around the body two times.

14. A method of attaching two objects, the method comprising:
   providing an adaptable mount;
   placing a first object on a first side of the adaptable mount;

wrapping a tail of the adaptable mount around the first object to a first hook;

engaging the first hook with a first lateral reinforcement of the tail;

placing a second object on a second side of the adaptable mount;

wrapping the tail of the adaptable mount around the second object to a second hook; and engaging the second hook with a second lateral reinforcement of the tail wherein the tail nests between two frontal grooves in the adaptable mount.

15. The method of claim 14, further comprising:

stretching the tail as part of the wrapping and engaging around the first and second objects.

16. The method of claim 14, further comprising:

positioning a cutout area of the tail on the second object, such that the cutout area is positioned to provide access to a touch interface menu of the second object, the second object being an electronic device.

17. The method of claim 14, wherein the first side has a cylindrical recess and is adapted for receiving a cylindrical shape.

\* \* \* \* \*